United States Patent [19]

Oddenino

[11] Patent Number: 5,219,185
[45] Date of Patent: Jun. 15, 1993

[54] SNAP-ON FLUIDTIGHT PIPE CONNECTING DEVICE

[75] Inventor: Manrico Oddenino, Buttigliera Alta, Italy

[73] Assignee: ITW Fastex Italia S.p.A., Torino, Italy

[21] Appl. No.: 790,925

[22] Filed: Nov. 13, 1991

[30] Foreign Application Priority Data

Nov. 13, 1990 [IT] Italy .............. 53369/90[U]

[51] Int. Cl.⁵ ............................................. F16L 35/00
[52] U.S. Cl. .................................. 285/26; 285/137.1;
285/305; 285/187; 285/317; 285/921
[58] Field of Search ............... 285/26, 29, 137.1, 305,
285/317, 187, 921

[56] References Cited

U.S. PATENT DOCUMENTS

| | | | |
|---|---|---|---|
| 1,078,112 | 11/1913 | Storm | 285/317 X |
| 1,883,509 | 10/1932 | Boone | 285/187 |
| 2,438,312 | 3/1948 | Bunn et al. | 285/187 X |
| 3,133,777 | 5/1964 | Anhalt | 285/305 X |
| 3,365,220 | 1/1968 | Rusche | 285/305 X |
| 4,076,279 | 2/1978 | Kiotz et al. | 285/26 |
| 4,211,439 | 7/1980 | Moldestad | 285/27 |
| 4,311,328 | 1/1982 | Truchet | 285/317 X |
| 4,423,892 | 1/1984 | Bartholomew | 285/305 X |
| 4,555,130 | 11/1985 | McClain | 285/26 |
| 4,667,987 | 5/1987 | Knebel | 285/137.1 |
| 4,804,208 | 2/1989 | Dye | 285/26 |

FOREIGN PATENT DOCUMENTS

| | | | |
|---|---|---|---|
| 0571654 | 9/1977 | U.S.S.R. | 285/137.1 |
| 1030535 | 5/1966 | United Kingdom | 285/305 |

Primary Examiner—Dave W. Arola
Assistant Examiner—Heather Chun

[57] ABSTRACT

A snap-on device for butt connecting in fluidtight manner one or more pairs of pipes, in particular vehicle fuel supply pipes. The device consists of a cup-shaped body having at least a first integral pipe connected hydraulically to a seat inside the body; and a block connectable inside the seat and molded on at least a second pipe, so that the end of the second pipe projects frontwards of the block in the insertion direction of the block inside the seat. The seat presents a recess coaxial with the first pipe and designed to receive the projecting end of the second pipe in sliding and fluidtight manner; and releasable locking structure for locking the block inside the seat, while at the same time permitting axial movement of the block and the projecting end of the second pipe inside the seat and recess respectively.

16 Claims, 4 Drawing Sheets ced by butt connecting a number of pipes. For example, each conduit may comprise at least a long straight center pipe running underneath the vehicle floor, and two curved end pipes of given shape, for respectively connecting the straight pipe to the tank and the supply member. The connection of these pipes, which is currently done at the on-vehicle assembly stage, poses various problems. On the one hand, it complicates the assembly process, while, on the other other, and more importantly, it may result in trouble due to the thermal expansion the center pipe in particular is subject to in service. This, in fact, as it expands against the joints, sags and, if not adequately supported, may even scrape against uneven road surfaces, thus resulting in damage and fuel leakage. The same also applies, of course, in the case of failure of the joints, should the pipe be restrained too rigidly.

SNAP-ON FLUIDTIGHT PIPE CONNECTING DEVICE

FIELD OF THE INVENTION

The present invention relates to a device for connecting rapidly and in fluidtight manner two or more pipes, in particular, vehicle fuel supply pipes.

BACKGROUND OF THE INVENTION

On vehicle fuel supply systems, the actual supply member (carburetor and petrol or injection pump) is connected to the fuel tank by systems consisting of two or three side by side conduits, which provide for fuel supply and feedback to and from the supply member and (the third conduit, which may be dispensed with) for recirculating the fuel vapours. For transport and storage reasons, these conduits, which are both long and complex in shape, are formed by butt connecting a number of pipes. For example, each conduit may comprise at least a long straight center pipe running underneath the vehicle floor, and two curved end pipes of given shape, for respectively connecting the straight pipe to the tank and the supply member. The connection of these pipes, which is currently done at the on-vehicle assembly stage, poses various problems. On the one hand, it complicates the assembly process, while, on the other other, and more importantly, it may result in trouble due to the thermal expansion the center pipe in particular is subject to in service. This, in fact, as it expands against the joints, sags and, if not adequately supported, may even scrape against uneven road surfaces, thus resulting in damage and fuel leakage. The same also applies, of course, in the case of failure of the joints, should the pipe be restrained too rigidly.

OBJECTS OF THE INVENTION

It is the object of the present invention to provide a snap-on fluidtight pipe connecting device for simultaneously butt connecting one or more pairs of pipes, for forming one or more side by side conduits, and enabling relative axial movement and thermal expansion of the connected pipes of each conduit. In particular, it is an object of the present invention to provide a connecting device of the aforementioned type, which may be used on vehicle fuel supply systems, for enabling fast, troublefree assembly of the conduit/s.

SUMMARY OF THE INVENTION

According to the present invention, there is provided a device for butt connecting rapidly and in fluidtight manner one or more pairs of pipes, in particular, vehicle fuel supply pipes; characterised by the fact that it comprises a cup-shaped body having at least a first integral pipe connected hydraulically to a respective seat inside the same, and a block mating with said seat and co-molded on at least a second pipe, so that one end of said second pipe projects frontwards of said block, in the insertion direction of said block inside said seat; said seat having a recess communicating with said first pipe and receiving said projecting end of said second pipe in sliding and fluidtight manner, and releasable locking means for locking said block inside said seat, while at the same time permitting axial movement of said block and said projecting end of said second pipe inside said seat and said recess respectively.

BRIEF DESCRIPTION OF THE DRAWINGS

A non-limiting embodiment of the invention will be described by way of example with reference to the accompanying drawings, in which like reference characters designate like or corresponding parts throughout the several views, and wherein.

DETAILED DESCRIPTION OF THE INVENTION

Number 1 in FIGS. 1 to 6 indicates a connecting device for butt connecting mechanically and in fluidtight manner one or more pairs of pipes for forming conduits. The non-limiting embodiment shown of the present invention provides for simultaneously connecting three pairs of side by side pipes 2,3-4,5-6,7 to form three side by side conduits 8, 9, 10 (FIG. 4) forming part, in the example shown, of a known vehicle fuel supply system (not shown). Clearly, the following description applies to the formation of any number of conduits of any type. That is, device 1 may be used solely for connecting pipes 2 and 3 into one conduit; or for connecting pipes 2,3 and 4,5 into two side by side conduits; or for connecting eight or more pipes into any number of side by side conduits. Needless to say, the pipes may either lie in different planes, or in the same plane as shown in the example.

Figure 1:
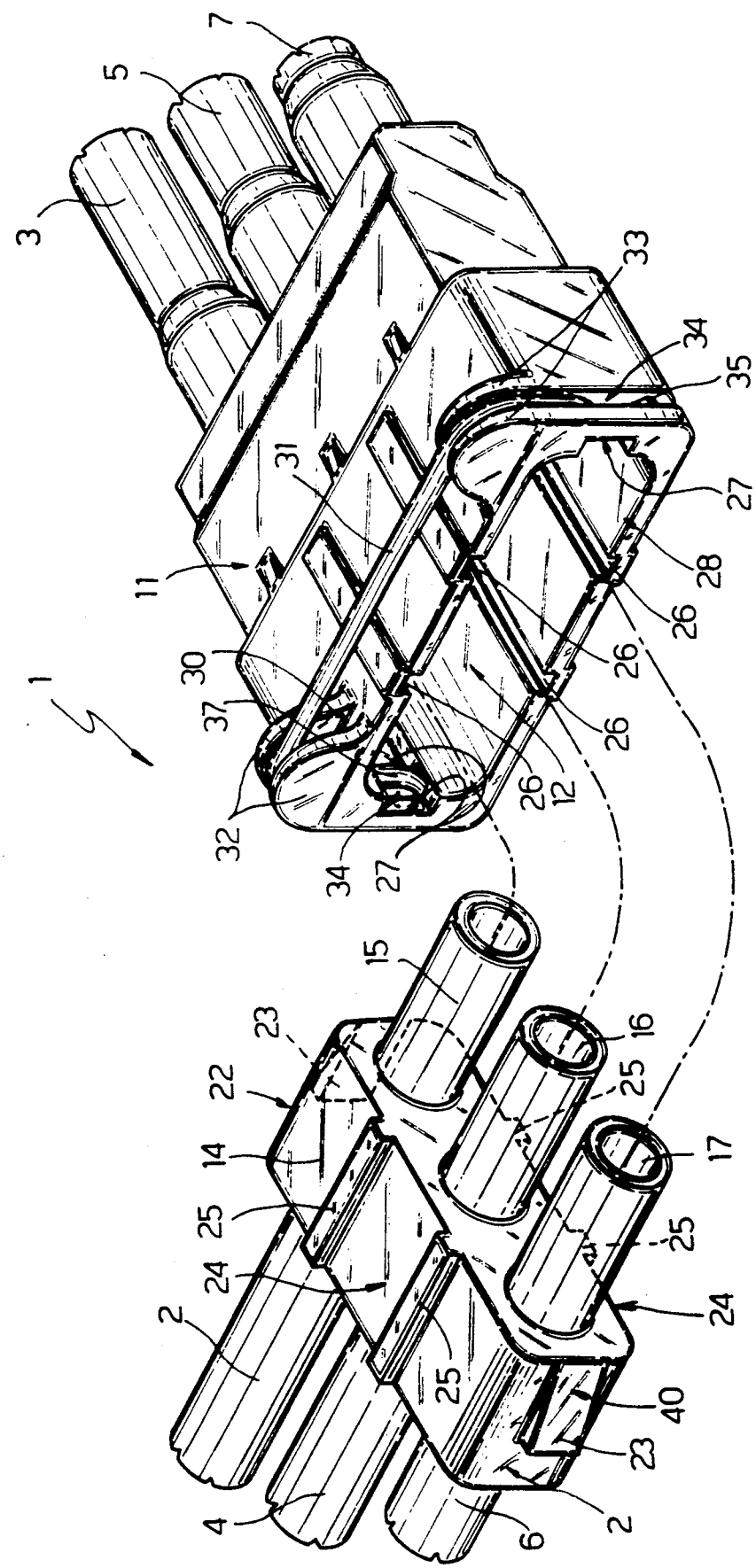
FIG. 1 shows a view in perspective of the device according to the present invention in the released position.
Figure 2:
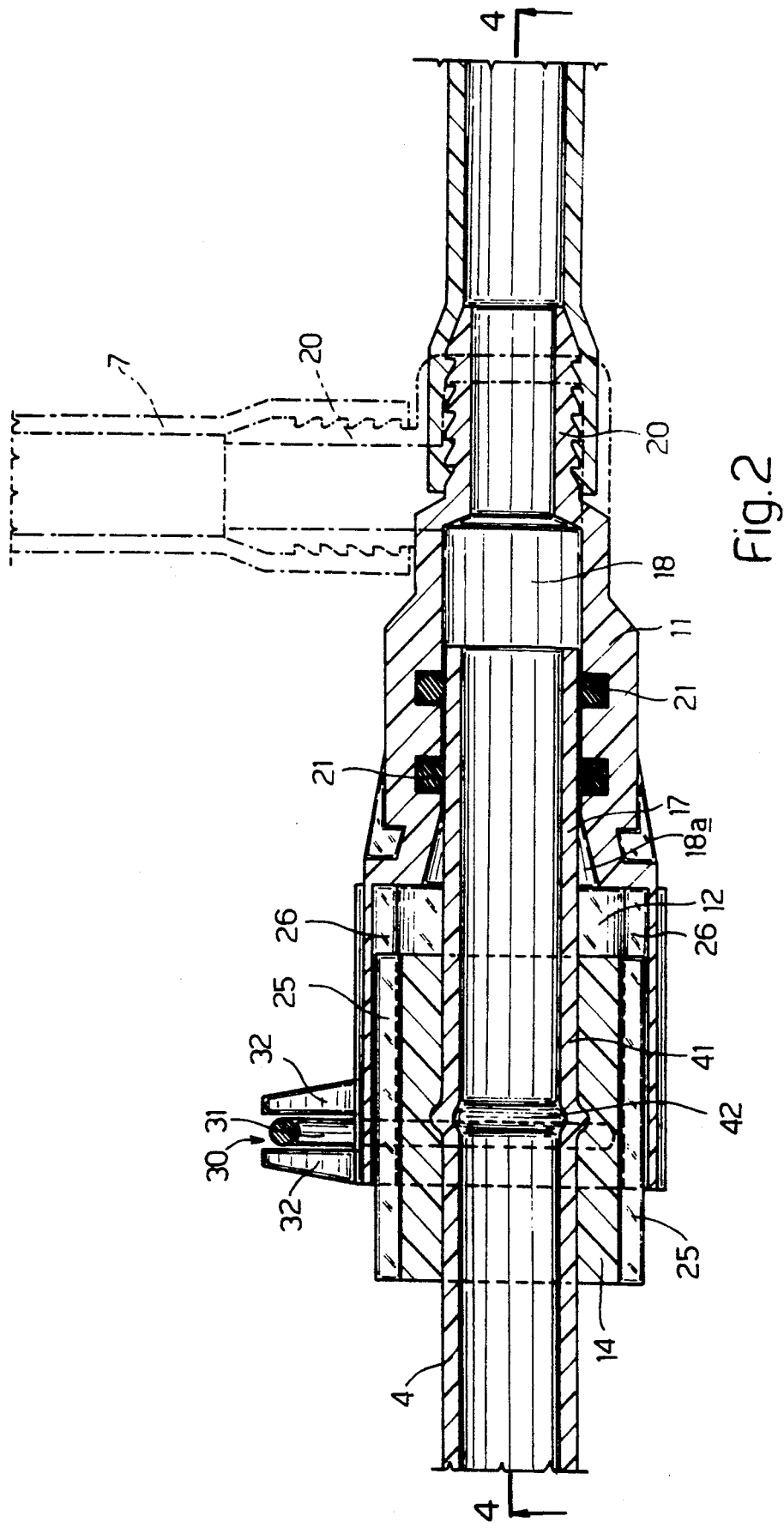
FIG. 2 shows a side section of the FIG. 1 device when locked.
Figure 3:
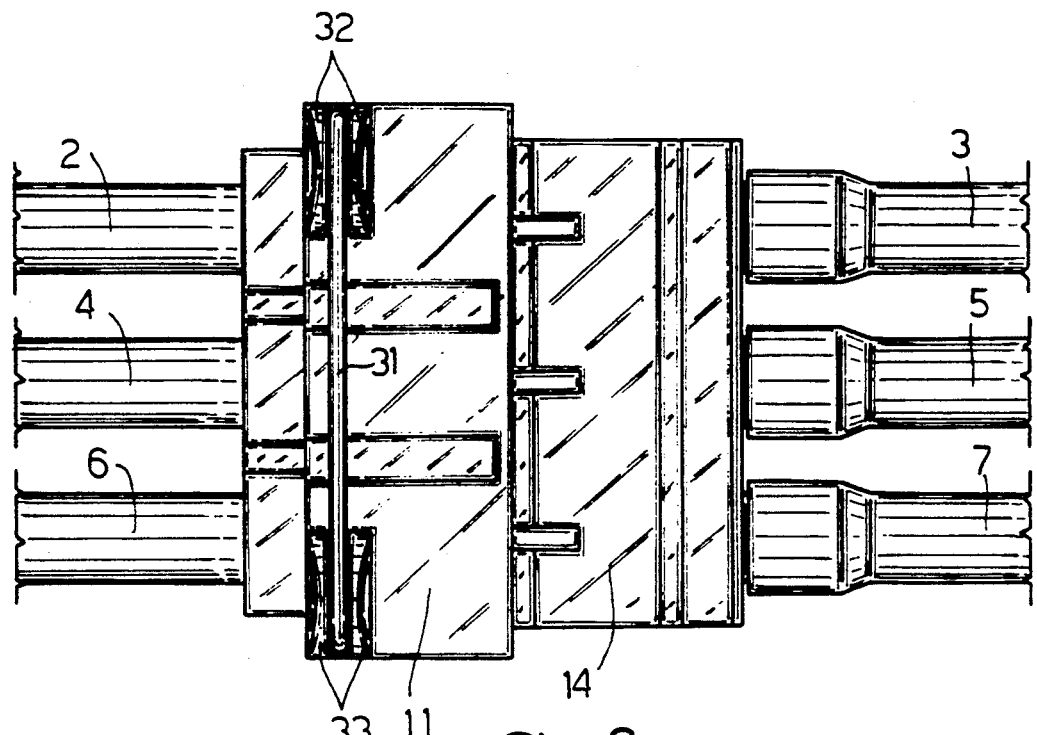
FIG. 3 shows a top plan view of the FIG. 1 device when locked.
Figure 4:
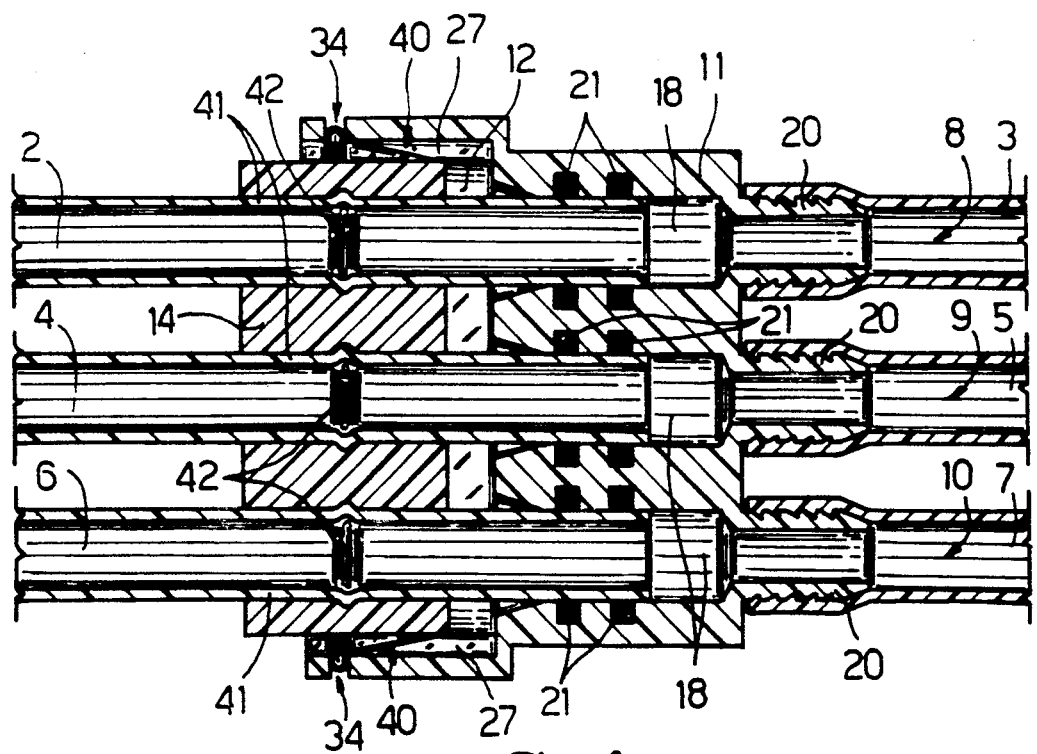
FIG. 4 shows a section along line 4—4 in FIG. 2.
Figure 5:
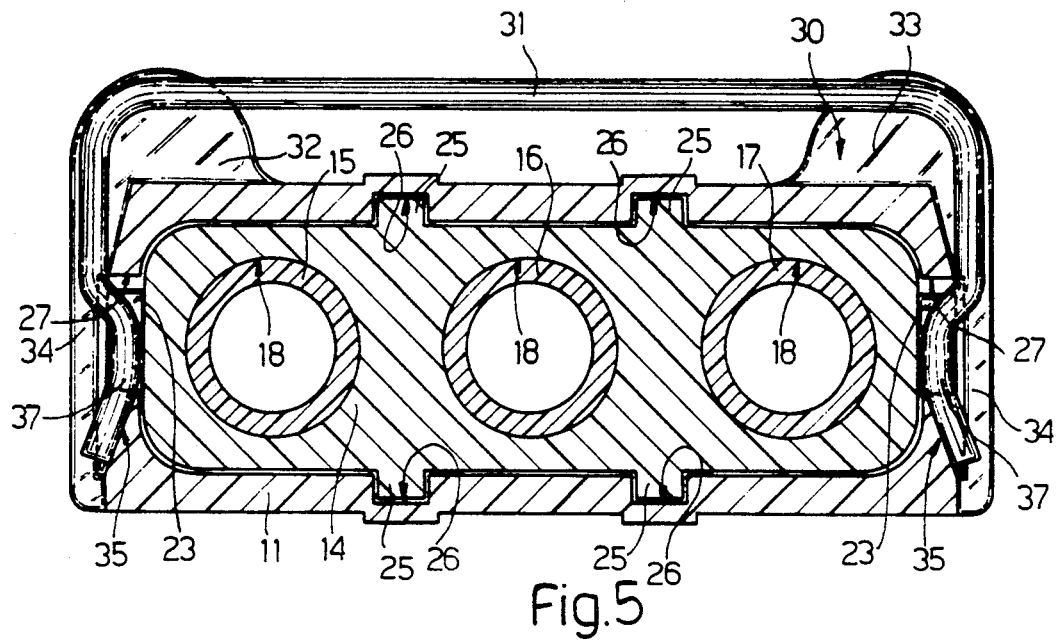
FIGS. 5 and 6 show larger-scale cross sections of the FIG. 1 device with a component part in two different operating positions.
Figure 6:
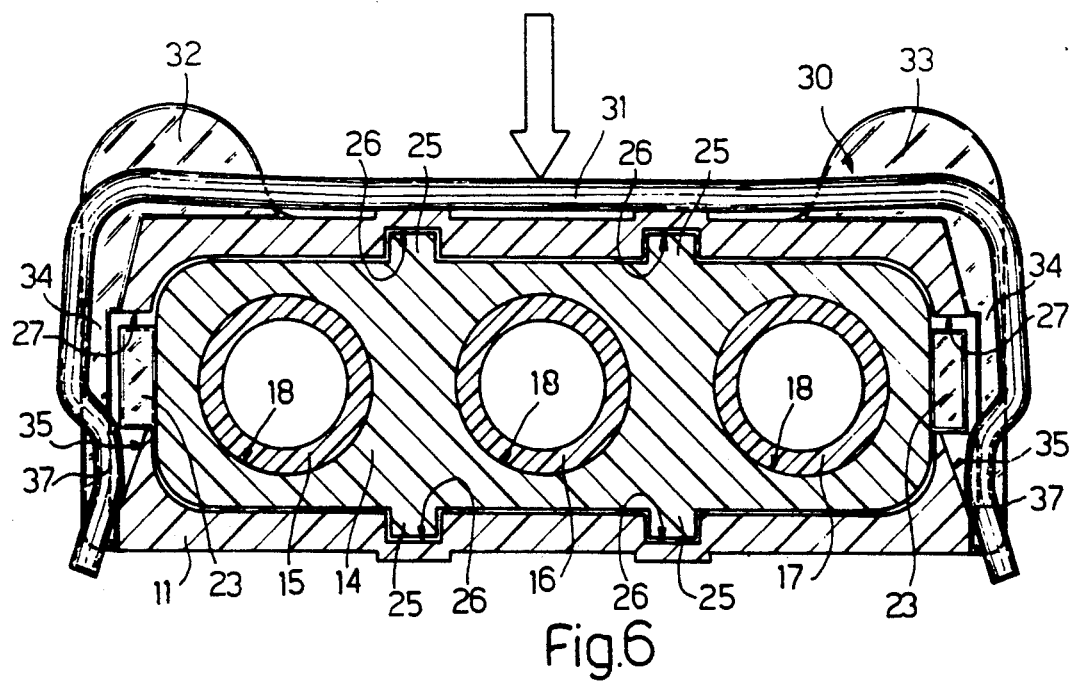

Device 1 comprises a cup-shaped body 11 having three integral pipes 3, 5, 7 connected hydraulically to an inner seat 12; and a block 14 connectable to seat 12 and, in the example shown, molded across three pipes 2, 4, 6, so that the respective ends 15, 16, 17 project frontwards of the block, in the insertion direction of the block inside seat 12. For each pipe 2, 4, 6, seat 12 presents a recess 18 with a flared opening 18a (FIG. 2) communicating hydraulically through body 11 with a respective pipe 3, 5, 7, and designed to receive respective projecting end 15, 16, 17 in sliding and fluidtight manner. In the example shown, recess 18, which, when block 14 is inside seat 12, is coaxial with pipe 2, receives end 15 to connect pipes 2 and 3 through body 11; similarly, center recess 18 coaxial with pipe 4 connects this to pipe 5 by receiving end 16; and the next recess 18 coaxial with pipe 6 connects this to pipe 7 by receiving end 17. Pipes 3, 5, 7 are connected to recesses 18 in the conventional manner, by means of unions 20, on body 11, connected hydraulically to recesses 18. Alternatively, pipes 3, 5, 7 may also be molded together with body 11 and connected directly to recesses 18. As shown in FIG. 2, unions 20 may be formed coaxial with recesses 18, or (alternative embodiment shown by the dotted line) at an angle (e.g. 90°) in relation to recesses 18, for arranging pipes 3, 5, 7 on different planes to pipes 2, 4, 6. Hydraulic sealing between ends 15, 16, 17 and body 11 is assured by respective O-rings 21 or similar assembled in known manner inside recesses 18.

According to the present invention, device 1 also comprises releasable locking means for locking block 14 inside seat 12, while at the same time permitting axial movement of block 14 inside seat 12 and of respective ends 15, 16, 17 inside recesses 18. In the example shown, block 14 is substantially a rectangular parallelepiped, and presents, on the outside, on respective first lateral faces 22 to the side of pipes 2, 4, 6, respective serrated locking elements 23. On respective second lateral faces 24 perpendicular to the first, block 14 presents respective axial projections or ribs 25. (axial in the sense that they lie in the insertion direction of block 14 inside seat 12) cooperating in sliding manner with respective axial grooves 26 inside seat 12. Seat 12 also presents lateral grooves 27 for receiving in sliding manner serrated locking elements 23 on block 14. According to the present invention, the axial length of locking elements 23, block 14 and projecting ends 15, 16, 17 is respectively less (FIGS. 2, 4) than that of grooves 27, seat 12 and recesses 18, which are parallel to grooves 27 but set back in relation to the same towards the inside of seat 12.

Close to the opening of grooves 27, coinciding with opening 28 of seat 12 (FIG. 2), body 11 presents an outer C-shaped housing 30 for an elastic clamping element 31. In particular, housing 30 is defined in the gap between two pairs of outer tabs 32, 33 on top of body 11; and by two grooves 34 defining the opposite ends of housing 30 and formed on the outer sides of body 11, perpendicular to and intersecting inner grooves 27. On the opposite side to tabs 32, 33, grooves 34 are defined by respective sloping, diverging end walls 35 facing outwards of housing 30 and cooperating with respective ends 37 of element 31 curving towards each other inwards of seat 12. In particular, elastic element 31 is defined by a wire spring bent substantially into the shape of a compressed Ω, and is designed to selectively assume, inside housing 30, a first position (FIG. 5) wherein it is undeformed and partially withdrawn from housing 30, with curved ends 37 located, through grooves 34, inside grooves 27 of seat 12, thus interfering with serrated locking elements 23 on block 14; and a second position (FIG. 6) wherein elastic element 31, subjected to pressure by the user in the direction of the arrow, is inserted fully inside housing 30 and deformed elastically by virtue of ends 37 cooperating with oblique walls 35. As shown clearly in FIG. 6, in said second position, ends 37 are pushed out of housing 30 by virtue of inclined walls 35, and are positioned out of line with and therefore outside grooves 27, in a position wherein no part of elastic element 31 can interfere with serrated locking elements 23 on block 14. For enabling the user to apply said pressure on element 31 for releasing ends 37 from grooves 27, tabs 32 and 33 are so shaped and located as to leave a transverse gap housing element 31 where it can be operated conveniently. Alternatively, ends 37 may be released from grooves 27 by operating in the opposite direction to the arrow in FIG. 6, i.e. so as to draw element 31 away from body 11. In this case, elastic element 31 may differ in shape, with a middle portion contacting body 11, and release is effected using a tool for releasing elastic element 31. With this solution, element 31 can be operated even in cases where, for any reason, e.g. space shortage, direct manual operation of element 31 is either impossible or to be avoided.

From the foregoing description, it will be clear that insertion of block 14 inside seat 12 results in insertion of ends 15, 16, 17 inside respective recesses 18, thus simultaneously connecting pipes 2, 4, 6 to pipes 3, 5, 7. Such insertion is permitted by moving element 31 into the FIG. 6 position, wherein block 14 may still be withdrawn from seat 12 for disconnecting pipes 2, 4, 6 from pipes 3, 5, 7. When, on the other hand, element 31 is in the FIG. 5 position (to which it springs back from the FIG. 6 position when the pressure in the direction of the arrow is released), it obviously provides for locking block 14 inside seat 12, any withdrawal being prevented by teeth 23 contacting ends 37, which thus act as stops. In this position, with block 14 inserted inside seat 12, pipes 2, 4, 6 are permitted to move in relation to body 11 and, therefore, pipes 3, 5, 7, due to the greater axial size of seat 12. Consequently, any thermal expansion is absorbed and compensated for with no stress on device 1, and with no flexural deformation of the pipes connected to it.

Block 14 may also click inside body 11, without operating element 31, by virtue of serrated locking elements 23 defining, in the insertion direction of block 14 inside seat 12, respective inclined surfaces 40, which cooperate, during insertion, with curved ends 37 for flexibly widening element 31 and so releasing ends 37 from grooves 27. Thus, during insertion of block 14 inside seat 12, teeth 23 are unhindered by the stops consisting of ends 37, thus permitting full insertion of block 14 and connection of ends 15, 16, 17 inside recesses 18. Element 31 then clicks to reset ends 37 inside grooves 27 and so prevent subsequent withdrawal of block 14, by virtue of the shape of teeth 23 no longer permitting inversion of block 14 inside seat 12 for widening element 31.

To ensure firm connection of block 14 and pipes 2, 4, 6, these may present, on respective connecting portions 41 embedded through block 14, respective annular upset portions 42 defining outer radial projections for axially locking the pipes in relation to block 14.

I claim:

1. An assembly for connecting together at least one pair of fluid conduits, comprising:
a body having a first fluid conduit fixedly connected to one end thereof, a hollow seat portion defined within a second opposite end thereof, and a recess portion interposed between and fluidically connecting said seat portion to said first fluid conduit;
a block member having a second fluid conduit fixedly mounted therein such that one end of said second fluid conduit extends outwardly from said block member, in the direction of insertion of said block member within said seat portion of said body, such that said one end of said second fluid conduit can fluidically communicate with said first fluid conduit and yet be slidably disposed within said recess portion of said body so as to provide for thermal expansion of said one end of said second fluid conduit within said recess portion of said body;
releasable locking means defined between said block member and said body for releasably locking said block member within said seat portion of said body at such a position that axial movement of said block member within said seat portion of said body, and axial movement of said one end of said second fluid conduit within said recess portion of said body, is able to be achieved after said block member has been locked within said body so as to permit said thermal expansion of both said block member and said second fluid conduit member of said assembly within said seat portion and said recess portion, respectively, of said body;

rib means defined upon said block member; and
groove means defined upon said body and extending axially throughout said seat portion of said body for accommodating said rib means of said block member so as to permit said axial movement of said block member within said seat portion of said body after said block member has been releasably locked within said seat portion of said body.

2. An assembly as set forth in claim 1, wherein:
a plurality of fluid conduits are fixedly connected to said body; and
a plurality of fluid conduits are fixedly mounted within said block member for fluidically communicating respectively with said plurality of fluid conduits fixedly connected to said body.

3. An assembly as set forth in claim 2, wherein:
said plurality of fluid conduits fixedly connected to said body, and said plurality of fluid conduits fixedly mounted within said block member, comprise three fluid conduits.

4. An assembly as set forth in claim 3, wherein:
said three fluid conduits fixedly mounted within said block member, and said three fluid conduits fixedly connected to said body, are disposed in side-by-side co-planar relationship with respect to each other.

5. An assembly as set forth in claim 1, wherein:
said block member has the configuration of a rectangular parallelepiped.

6. An assembly as set forth in claim 5, wherein:
said releasable locking means defined upon said block member comprises a plurality of detents disposed upon opposite sides of said block member, and said rib means are disposed upon opposite sides of said block member which are different from said opposite sides of said block member upon which said detents are disposed.

7. An assembly as set forth in claim 5, wherein said releasable locking means defined upon said body comprises:
a plurality of grooves defined within opposite sides of said body and within the vicinity of said second opposite end of said body for accommodating said plurality of detents disposed upon said opposite sides of said block member; and
a locking element movably mounted upon said body between a first position at which said locking element is disposed within said plurality of grooves of said body so as to be disposed behind said plurality of detents as viewed in said direction of insertion of said block member within said seat portion of said body and thereby block withdrawal of said block member out from said seat portion of said body, and a second position at which said locking element is disposed outside of said plurality of grooves of said body so as to permit said plurality of detents of said block member to move freely within said plurality of grooves of said body in order to permit said block member to be inserted within and withdrawn from said seat portion of said body.

8. An assembly as set forth in claim 7, wherein:
said locking element comprises a substantially C-shaped elastic wire member.

9. An assembly as set forth in claim 8, further comprising:
substantially C-shaped slot means defined within an external peripheral portion of said body within said vicinity of said second opposite end of said body for accommodating said substantially C-shaped elastic wire member.

10. An assembly as set forth in claim 8, further comprising:
diverging wall means defined upon said body and engaging end portions of said substantially C-shaped elastic wire member for normally biasing said end portions of said substantially C-shaped elastic wire member, and therefore said substantially C-shaped elastic wire member, toward said first position at which said end portions of said substantially C-shaped elastic wire member are disposed within said plurality of grooves of said body so as to block withdrawal of said block member out from said seat portion of said body.

11. An assembly as set forth in claim 8, wherein:
said plurality of detents have forwardly inclined surface portions as viewed in the direction of insertion of said block member within said seat portion of said body for lockingly engaging said elastic wire member in a snap-fitting manner by initially engaging end portions of said wire member and laterally expanding said end portions of said wire member out of said plurality of grooves of said body, and subsequently permitting said end portions of said wire member to re-enter said plurality of grooves of said body when said plurality of detents have passed beyond said wire member as said block member is moved into said seat portion of said body in said direction of insertion.

12. An assembly as set forth in claim 1, wherein:
said first fluid conduit is fixedly connected to said body by means of a threaded union which is disposed coaxially with respect to said recess portion of said body.

13. An assembly as set forth in claim 1, wherein:
said first fluid conduit is fixedly connected to said body by means of a threaded union which has an axis disposed perpendicular to a longitudinal axis of said recess portion of said body.

14. An assembly as set forth in claim 1, further comprising:
annular sealing means disposed within said body and coaxially about said recess portion of said body for engaging a peripheral outer portion of said second fluid conduit of said block member when said block member is disposed within said seat portion of said body and said one end of said second fluid conduit is disposed within said recess portion of said body so as to fluidically seal said one end of said second fluid conduit with respect to said recess portion of said body.

15. An assembly as set forth in claim 14, wherein:
said annular sealing means comprises O-rings.

16. An assembly as set forth in claim 1, wherein:
said second fluid conduit comprises an annular upset portion disposed within a plane transverse to a longitudinal axis of said second fluid conduit, and said block member has an annular groove portion defined therein for accommodating said annular upset portion of said second fluid conduit, whereby said second fluid conduit is axially fixed within said block member.

* * * * *